United States Patent
Sitaram et al.

(10) Patent No.: US 9,088,959 B1
(45) Date of Patent: Jul. 21, 2015

(54) PAGING BACK-OFF TIMER

(71) Applicant: Sprint Spectrum LP, Overland Park, KS (US)

(72) Inventors: Krishna Sitaram, Chantilly, VA (US); Daniel Vivanco, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 43 days.

(21) Appl. No.: 14/091,167

(22) Filed: Nov. 26, 2013

(51) Int. Cl.
*H04W 68/00* (2009.01)
*H04W 68/02* (2009.01)

(52) U.S. Cl.
CPC ...................................... *H04W 68/02* (2013.01)

(58) Field of Classification Search
CPC .......................................... H04W 68/00–68/12
USPC .................... 455/422.1, 426.1, 453, 458, 515
See application file for complete search history.

(56) References Cited

U.S. PATENT DOCUMENTS

| | | | |
|---|---|---|---|
| 6,678,258 B1 * | 1/2004 | Capurka et al. .............. | 370/328 |
| 7,266,612 B1 * | 9/2007 | Heyman ........................ | 709/232 |
| 7,831,686 B1 * | 11/2010 | Tran et al. ..................... | 709/217 |
| 7,941,175 B1 * | 5/2011 | Hoff et al. ...................... | 455/527 |
| 8,180,381 B1 * | 5/2012 | Shetty et al. ................... | 455/458 |
| 8,265,009 B2 | 9/2012 | Kamalaraj et al. | |
| 2005/0009534 A1 * | 1/2005 | Harris et al. .................. | 455/453 |
| 2006/0046762 A1 * | 3/2006 | Yoon et al. .................... | 455/519 |
| 2006/0052117 A1 * | 3/2006 | Katsube et al. ............... | 455/458 |
| 2009/0245176 A1 * | 10/2009 | Balasubramanian et al. | 370/328 |
| 2011/0244893 A1 * | 10/2011 | Wang et al. ................... | 455/458 |
| 2012/0071178 A1 * | 3/2012 | Sun et al. ...................... | 455/458 |
| 2013/0094371 A1 * | 4/2013 | Vallath et al. ................. | 370/252 |
| 2014/0162632 A1 * | 6/2014 | Gajula et al. ............... | 455/426.1 |

* cited by examiner

*Primary Examiner* — Rafael Pérez-Gutiérrez
*Assistant Examiner* — Mark G. Pannell

(57) ABSTRACT

The delivery of paging messages to an access node are delayed based on an estimated paging message load currently being handled by the access node. When a mobility node receives a request that requires a wireless device to be paged, the mobility node refers to an estimate of the current paging load on an access node. This estimate can be based on the number of paging messages that have been sent to the access node that have not elicited a response and have not expired. If the estimated load is less than a threshold amount (e.g., 80%), then the paging message can be sent to the access node without further delay. If the estimated load is greater than the threshold amount, then an amount of time to wait before sending the paging message to the access node is selected or calculated.

16 Claims, 5 Drawing Sheets

PAGING BACK-OFF TIMER

TECHNICAL BACKGROUND

Wireless communication may be used as a means of accessing a network. Wireless communication has certain advantages over wired communications for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). The European Telecommunications Standards Institute (ETSI) has also promulgated a standard known as long term evolution (LTE). Additional standards such as the fourth generation communication system (4G) are also being pursued. These standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication with a network. These aspects include processes for registering on the network, carrier modulation, frequency bands of operation, and message formats.

A wireless device can enter into a lower power state, such as an idle mode or a sleep mode, in which the wireless device is not in continuous communication with an access node. A communication system maintains a record of a recent location of the wireless device in an idle state in order to route paging messages to the wireless device if data is sent to the wireless device. One method of maintaining a record of a recent location of a wireless device is by use of a tracking area. A tracking area comprises a group of access nodes which are associated with a tracking area code. In addition, a tracking area list typically comprises the tracking area and a plurality of other tracking areas which are adjacent or proximate to the tracking area. When a message such as data arrives for a wireless device in an idle mode, a first paging message can be sent to the access node most recently in communication with the wireless device. When the wireless device does not respond to the first paging message within a predetermined period of time, a second paging message can be sent to all of the access nodes in the tracking area. When the wireless device does not respond to the second paging message within a predetermined period of time, a third paging message can be sent to all of the access nodes in the tracking area list.

Overview

In an embodiment, a method of operating a communication system includes receiving a request associated with a wireless device. In response to the request, it is determined that at least one paging message is to be sent to an access node associated with the wireless device. Based on an indicator of a paging load associated with the access node meeting a requirement threshold, a wait period before sending, to the access node, a first paging message associated with the request is determined.

In an embodiment, a communication system includes a first access node configured to receive paging messages and a processing node configured to send paging messages to the first access node. The processing node is further configured to, based on a first indicator of a first paging load associated with the first access node meeting a first requirement threshold, determine a first wait period before sending, to the first access node, a first paging message.

In an embodiment, a method of operating a communication system includes receiving, at a processing node, a request to communicate with a wireless device. In response to the request, a paging procedure that includes sending a first paging message to a first access node and a second paging message to a second access node is initiated. Based on a first indicator of a first paging load associated with the first access node, a first wait period before the first paging message is to be sent to the first access node is selected. Based on a second indicator of a second paging load associated with the second access node, a second wait period before the second paging message is to be sent to the second access node is selected.

DETAILED DESCRIPTION

In an embodiment, the delivery of paging messages to an access node can be delayed based on an estimated paging message load currently being handled by the access node. When a mobility node receives a request that requires a wireless device to be paged, the mobility node estimates the current paging load on an access node. This estimate can be based on the number of paging messages that have been sent to the access node that have not elicited a response and have not expired.

If the estimated load is less than a threshold amount (e.g., 80%), then the paging message can be sent to the access node without further delay. If the estimated load is greater than the threshold amount, then an amount of time to wait before sending the paging message to the access node is selected or calculated. The amount of time to wait can also be based on a quality of service or application type associated with the paging message. Once the wait time has transpired, the paging message is sent to the access node.

Figure 1:
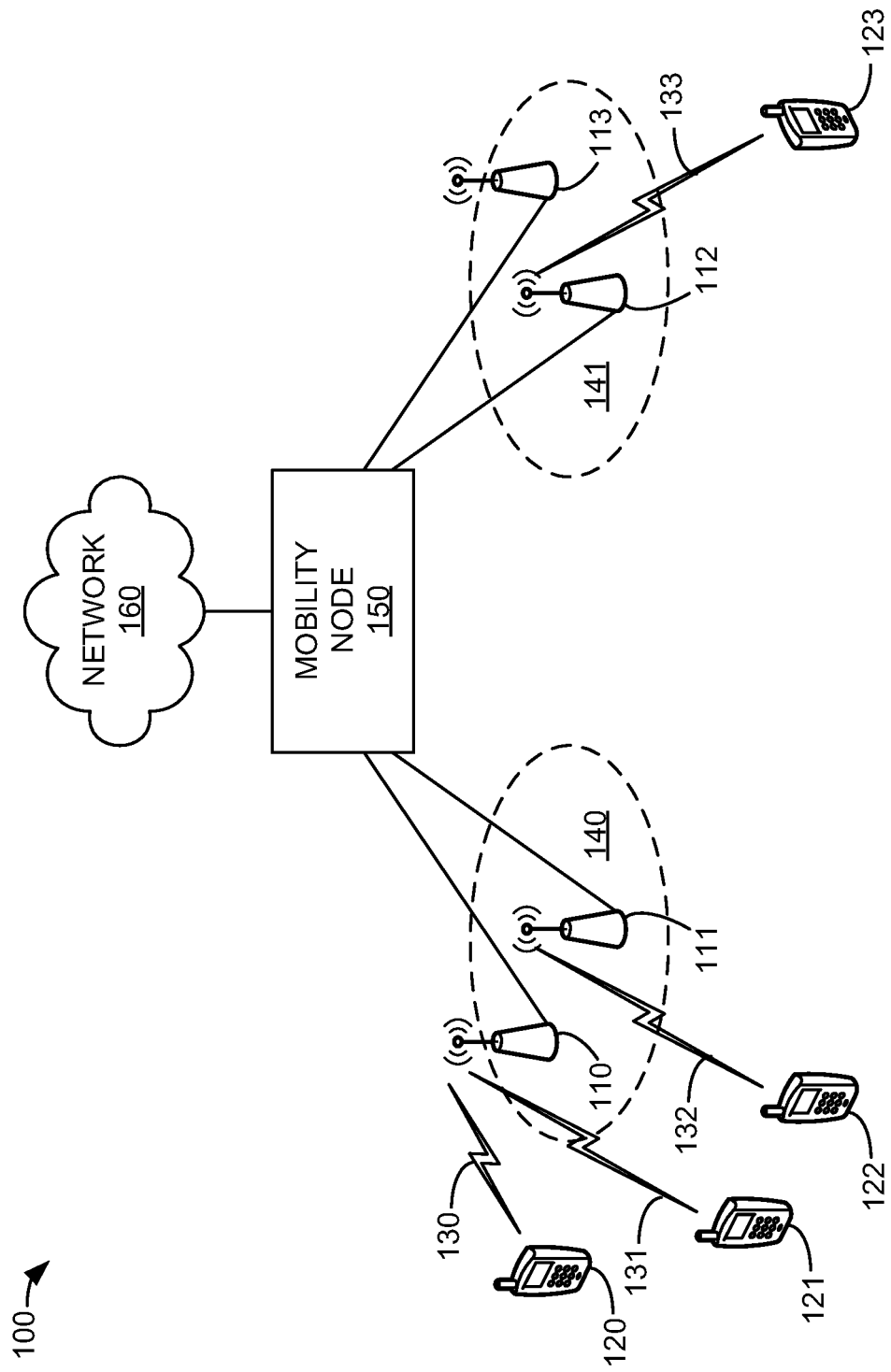
FIG. 1 is a block diagram illustrating an exemplary communication system for paging a wireless device.

FIG. 1 is a block diagram illustrating an exemplary communication system for paging a wireless device. In FIG. 1, communication system 100 comprises network 160, mobility node 150, access node 110, access node 111, access node 112, access node 113, wireless device 120, wireless device 121, wireless device 122, and wireless device 123. Mobility node 150 is operatively coupled to network 160. Mobility node 150 is also operatively coupled to access nodes 110-113. Wireless device 120 is operatively coupled to access node 110 via wireless link 130. Wireless device 121 is operatively coupled to access node 110 via wireless link 131. Wireless device 122 is operatively coupled to access node 111 via wireless link 132. Wireless device 123 is operatively coupled to access node 112 via wireless link 133.

Examples of wireless devices 120-123 can include a cell phone, a smart phone, a computing platform such as a laptop, palmtop, or tablet, a personal digital assistant, or an internet access device, including combinations thereof. Tracking area 140 includes access node 110 and access node 111. Tracking area 141 includes access node 112 and access node 113.

Communication system 100 is a communication network that can provide wireless communication to wireless devices 120-123. Network 160 is a communication network that can provide communication between access nodes 110-113 and other wired or wireless networks. Network 160 is a communication network that can provide communication between wireless devices 120-123 and access nodes 110-113 via other wired or wireless networks and wireless links.

Communication system 100 can comprise wired and/or wireless communication networks that include processing nodes, routers, gateways, physical and/or wireless data links for carrying data among various network elements, including combinations thereof, and can include a local area network, a wide area network, and an internetwork (including the Internet). Communication system 100 can also comprise wireless networks, including base station, wireless communication nodes, telephony switches, internet routers, network gateways, computer systems, communication links, or some other type of communication equipment, and combinations thereof.

Wired network protocols that may be utilized by communication system 100 and/or network 160 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols that may be utilized by communication system 100 and/or network 160 may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Links between access nodes 110-113, mobility node 150, and/or network 160 can be, for example, twisted pair cable, coaxial cable or fiber optic cable, or combinations thereof. Wireless links 130-133 can be a radio frequency, microwave, infrared, or other similar signal. Wireless links 130-133 can use a suitable communication protocol, for example, Worldwide Interoperability for Microwave Access (WiMAX), or Long Term Evolution (LTE), or combinations thereof. Other wireless protocols can also be used.

Other network elements may be present in communication system 100 (and present in wireless network 160, in particular) to facilitate wireless communication to/from wireless devices 120-123 but are omitted for clarity, such as base stations, base station controllers, gateways, mobile switching centers, dispatch application processors, and location registers such as a home location register or visitor location register. Furthermore, other network elements may be present to facilitate communication between access nodes 110-113, mobility node 150, and/or network 160 which are omitted for clarity, including additional processing nodes, routers, gateways, and physical and/or wireless data links for carrying data among the various network elements.

Wireless devices 120-123 may be any devices, systems, combination of devices, or other such communication platforms capable of communicating wirelessly with one or more of access nodes 110-113. One or more of wireless devices 120-123 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via one or more of access node 110-113, and network 160. Other types of communication platforms are possible.

Wireless devices 120-123 may establish communication sessions with one or more of access nodes 110-113 in order to receive communication service. This communication service may include voice service and data service. This communication service may include a plurality of services. These services may include but are not limited to telephone service, long distance service, mobile voice service, mobile data service, push-to-talk service, internet service, web browsing, email, pictures, picture messaging, video, video messaging, audio, voicemail, music, MP3's, ring tones, stock tickers, news alerts, and so on.

Access nodes 110-113 are network nodes capable of providing wireless communication to wireless devices 120-123. Access nodes 110-113 each can be, for example, a base transceiver station, a radio access node, an eNodeB device, or an enhanced eNodeB device. Access nodes 110-112 communicate information with wireless devices 120-123 via wireless links 130-133, respectively.

In an embodiment, access nodes 110-113 are configured to receive paging messages from mobility node 150. Mobility node 150 may delay delivery of paging messages to an access node 110-113 based on an estimated paging message load currently being handled by a respective access node 110-113. When mobility node 150 receives a request from network 160, mobility node 150 determines whether a wireless device 120-123 associated with that request needs to be paged.

For example, mobility node 150 may receive data destined for wireless device 120 when wireless device 120 is in an idle state. Because wireless device 120 is in an idle state, the request received from network 160 is determined by mobility node 150 to require that wireless device 120 be paged.

Before sending a paging message to one or more of access nodes 110-113, mobility node 150 can be configured to estimate the current paging load on a respective access node 110-113. For example, if mobility node 150 is sending a paging message to the access node 110 most recently in communication with wireless device 120, mobility node 150 would estimate the current paging load on access node 110. If mobility node 150 is sending a paging message to all of the access nodes 110-111 in tracking area 140, then mobility node 150 would estimate the current paging load on each of access nodes 110-111. If mobility node 150 is sending a paging message to all of the access nodes 110-113 in a tracking area list that includes both tracking area 140 and tracking area 141, then mobility node 150 would estimate the current paging load on each of access nodes 110-113.

The paging load estimates can be based on the number of paging messages that have been sent to the respective access node 110-113 and are still "active" (herein expressed as the variable λ). An "active" paging message is one that: (1) has been sent to an access node 110-113, (2) mobility node 150 has not received a reply, and (3) the paging response timer associated with that message has not expired. In LTE specified systems, this paging response timer is also known as T3413. The paging load estimates may be expressed as a percentage. For example, for a current estimate of 180 of the active paging messages associated with access node 110, and a limit of 200 to the number of active paging messages associated with access node 110, the paging load estimate may be expressed as:

$$LOAD_{110} = \frac{\lambda_{110}}{\max} = \frac{180}{200} = 90\%.$$

The paging load estimate may be updated periodically. The paging load estimate may be updated whenever a response is received to a paging message and/or whenever a paging response timer expires.

If the estimated load is less than a threshold amount (e.g., 80%), then mobility node 150 may be configured to send the paging message to the respective access node 110-113 without further delay. If the estimated load is greater than a threshold amount, then mobility node 150 may be configured select or calculate an amount of time to wait before sending the paging message to the respective access node 110-113. This amount of time can be selected as a function of the paging load. This amount of time can be selected as a function of the paging load and one or more paging response timer(s) associated with one or more paging messages that have already been sent to a respective access node 110-113. In other words, $T_i$, the time to wait before sending the paging message to a respective access node 110-113, can be selected (or calculated) as:

$$T_i = f\left(\frac{\lambda_i}{\max}, T_0\right),$$

where $T_0$ is the length of time of the paging response timer.

For example, consider a case where a paging load threshold has been set to 80%, the paging load ($\lambda_{111}$) on access node 111 is 82, $T_0$ is 10 mS, and a maximum number of active paging messages has been selected to be 100. Thus $$LOAD_{111} = \frac{82}{100} = 82\% > 80\%.$$

Since $$LOAD_{111} = \frac{82-2}{100} = 80\%,$$

and less than 80% is the desired paging load, it implies that mobility node 150 should wait until two (2) of the paging messages are no longer active on access node 111 before sending the next incoming paging message to access node 111. Accordingly, mobility node 150 may select to wait an amount of time greater than (or equal to) the maximum amount of time left before the paging response timer expires for the second oldest paging message that was sent by mobility node 150 to access node 111. In other words, if $t_1$ and $t_2$ represent the timestamp of the two oldest active paging messages sent by mobility node 150 to access node 110, and t equals the current time timestamp, then $T_i$ can be selected as:

$$T_i = \text{MAX } \{T_0-(t-t_1); T_0-(t-t_1)\},$$

where the function MAX { } selects the maximum element from the input arguments. Similarly, if $$LOAD_{111} = \frac{83}{100} = 83\%,$$

$T_i$ can be selected as:

$$T_i = \text{MAX } \{T_0-(t-t_1); T_0-(t-t_2); T_0-(t-t_3)\}.$$

It should be understood that the factors $T_0-(t-t_x)$ are timeout indicators for each of the respective paging messages. It should also be understood that the number of timeout indicators included as a basis for computing the amount of time to wait can be selected (as in the above examples) to be based on the number of paging messages that cause the paging load to exceed the requirement threshold.

The amount of time to wait can also be configured to be based on a quality of service or application type associated with the paging message. For example, the request that causes the paging process to be initiated may be associated with a quality of service indicator. This quality of service indicator may be used in the selection (or calculation) of the time to wait before sending the paging message to a respective access node 110-113. In other words:

$$T_i = f\left(\frac{\lambda_i}{\max}, T_0, Q_M\right),$$

where $Q_M$ is an indicator of the quality of service (or application type) associated with the request that caused the paging process to be initiated. For example, #

$$T_i = Q_M \times \text{MAX } \{T_0-(t-t_1); T_Q-(t-t_1)\},$$

where $Q_M$ has a relatively lower values for higher quality of service and relatively higher values for lower quality of service.

The amount of time to wait ($T_i$) may be updated periodically. The amount of time to wait may be updated whenever a paging message is sent, whenever a response is received to a paging message, and/or whenever a paging response timer expires. Once the wait time has transpired, the paging message is sent by mobility node 150 to the respective access node 110-113. In an embodiment, an amount of time to wait is only selected for paging message retransmissions. The first paging message sent to an access node 110-113 can be sent without a delay.

It should be understood that by selecting a wait time before sending paging messages to access nodes 110-113 that are estimated to be above a selected paging load threshold, mobility node 150 effectively creates a paging message delivery schedule for each access node 110-113. These schedule(s) help avoid page dropping by access nodes 110-113 while also helping to avoid long paging latency.

Figure 2:
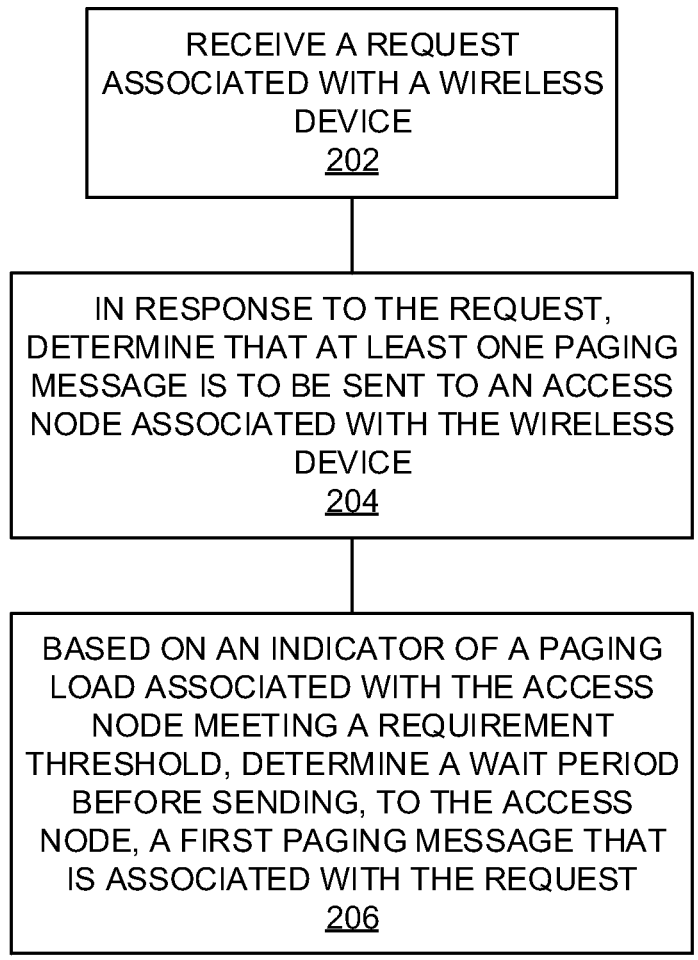
FIG. 2 is a flowchart illustrating a method of operating a communication system.

FIG. 2 is a flowchart illustrating a method of operating a communication system. The steps illustrated in FIG. 2 may be performed by one or more elements of communication system 100. A request associated with a wireless device is received (202). For example, mobility node 150 may receive, from network 160, a request to send data to wireless device 120.

In response to the request, it is determined that at least one paging message is to be sent to an access node associated with the wireless device (204). For example, in response to the request to send data to wireless device 120, mobility node 150 may determine that wireless device 120 is in an idle mode and therefore at least one of access nodes 110-113 should be sent a paging message. Mobility node 150 may select access node 110 to be sent a paging message because access node 110 was the one of access nodes 110-113 most recently in communication with wireless device 120. Mobility node 150 may select access node 110 and access node 111 to each be sent a paging message based on access node 110 and access node 111 being in tracking area 140 which is associated with wireless device 120. Mobility node 150 may select access nodes 110-113 to each be sent a paging message based on tracking area 140 and tracking area 141 being in a tracking area list that includes tracking area 140 and tracking area 141 and is associated with wireless device 120.

Based on an indicator of a paging load associated with the access node meeting a requirement threshold, a wait period is determined before sending, to the access node, a first paging message that is associated with the request (206). For example, mobility node 150 may estimate a paging load associated with access node 110 (e.g., number of paging request messages still active at access node 110 divided by a maximum limit of paging messages). If this paging load estimate meets a requirement threshold (e.g., greater than or equal to 80%), then a wait period is calculated or selected before sending the paging message associated with the request (e.g., $T_i$—described herein).

In an embodiment, this wait period can be based on the indicator of the paging load. The wait period can also be based on a timeout indicator that is associated with a second paging message that has already been sent to the access node (e.g., the indicator calculated as: $T_0-(t-t_x)$, described herein). The wait period may be based on a quality of service indicator (e.g., $Q_M$ described herein). The wait period can also be based on a plurality of timeout indicators that are associated with a respective plurality of paging messages that have already been sent to the access node (e.g., the indicators calculated as: $T_0-(t-t_x)$, described herein). The wait period can be based on a maximum one of these plurality of timeout indicators. The number of messages in the plurality of paging messages can be selected based on the number of paging messages that cause the indicator of the paging load to exceed the requirement threshold.

Figure 3:
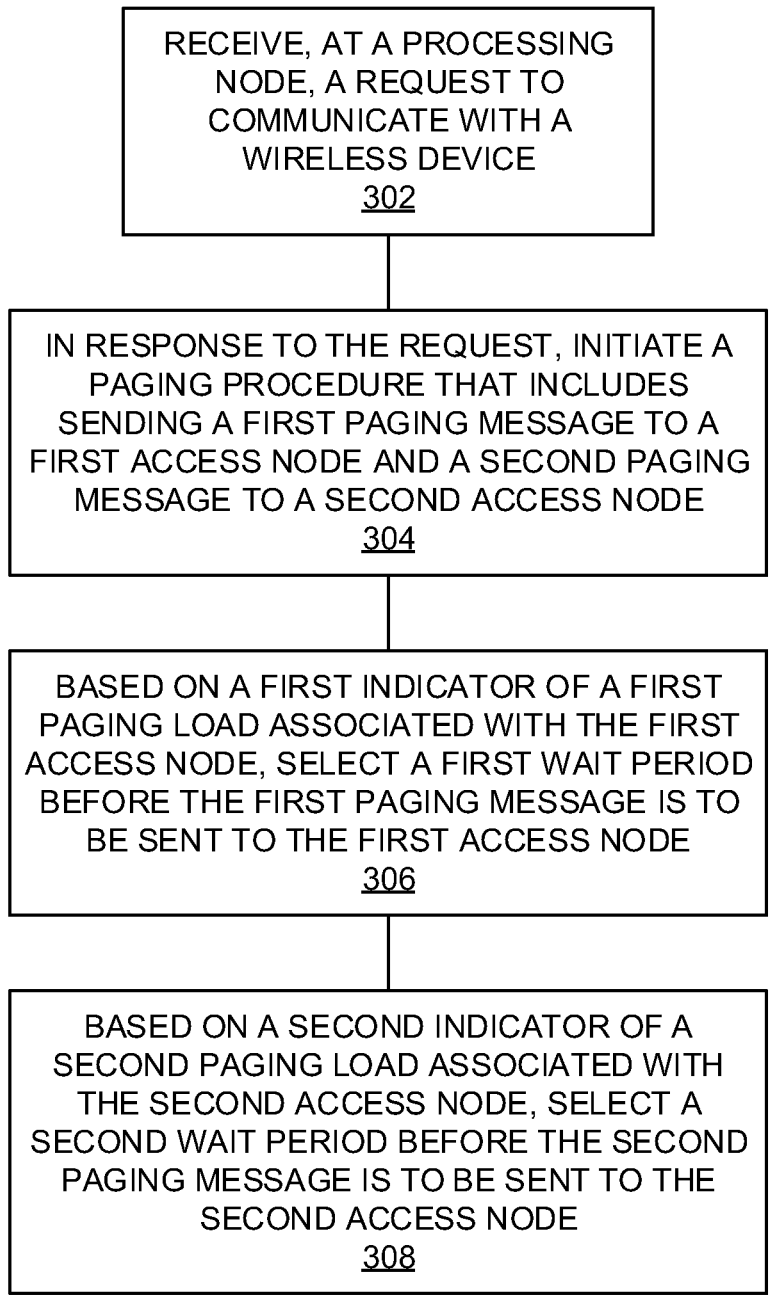
FIG. 3 is a flowchart illustrating a method of sending paging messages.

FIG. 3 is a flowchart illustrating a method of sending paging messages. The steps illustrated in FIG. 3 may be performed by one or more elements of communication system 100. At a processing node, a request to communicate with a wireless device is received (302). For example, mobility node 150 may receive, from network 160, a request to communicate with wireless device 120.

In response to the request, a paging procedure is initiated that includes sending a first paging message to a first access node and a second paging message to a second access node (304). For example, in response to the request to communicate with wireless device 120, mobility node 150 may initiate a paging procedure. This paging procedure may include sending a first paging message to access node 110 and a second paging message to access node 111.

Based on a first indicator of a first paging load associated with the first access node, a first wait period before the first paging message is to be sent to the first access node is selected (306). For example, based on an estimated paging load associated with access node 110 meeting a requirement threshold, mobility node 150 may choose to delay the sending of a paging message to access node 110 by a wait period. This wait period may be selected, for example, based on expiration times associated with a selected number of paging messages that have already been sent to access node 110.

The selected paging messages whose expiration times are used as the basis for this wait period may correspond to the N number of the oldest, but still active and unacknowledged, paging messages sent to access node 110. The number N may be selected based on an amount of paging messages still active in access node 110 that causes the estimate of paging load on access node 110 to meet the requirement threshold. This wait period may be further selected based on a maximum paging latency that is associated with a quality of service indicator associated with the request.

Based on a second indicator of a second paging load associated with the second access node, a second wait period before the second paging message is to be sent to the second access node is selected (308). For example, based on an estimated paging load associated with access node 111 not meeting a requirement threshold, mobility node 150 may choose to send a paging message to access node 111 without further delay. In other words, based on an estimated paging load associated with access node 111 not meeting a requirement threshold, mobility node 150 may select not to have an additional (i.e., in addition to overhead delays) wait period (i.e., a minimized or minimal wait period).

If an estimated paging load associated with access node 111 meets the requirement threshold, mobility node 150 may choose a non-zero (or non-minimal) second wait period. The second wait period may be selected, for example, based on expiration times associated with a selected number of paging messages that have already been sent to access node 111. The selected paging messages whose expiration times are used as the basis for the second wait period may correspond to the M number of the oldest, but still active and unacknowledged, paging messages sent to access node 111. The number M may be selected based on an amount of paging messages still active in access node 111 that causes the estimate of paging load on access node 111 to meet the requirement threshold. The second wait period may be further selected based on a maximum paging latency that is associated with a quality of service indicator associated with the request.

Figure 4:
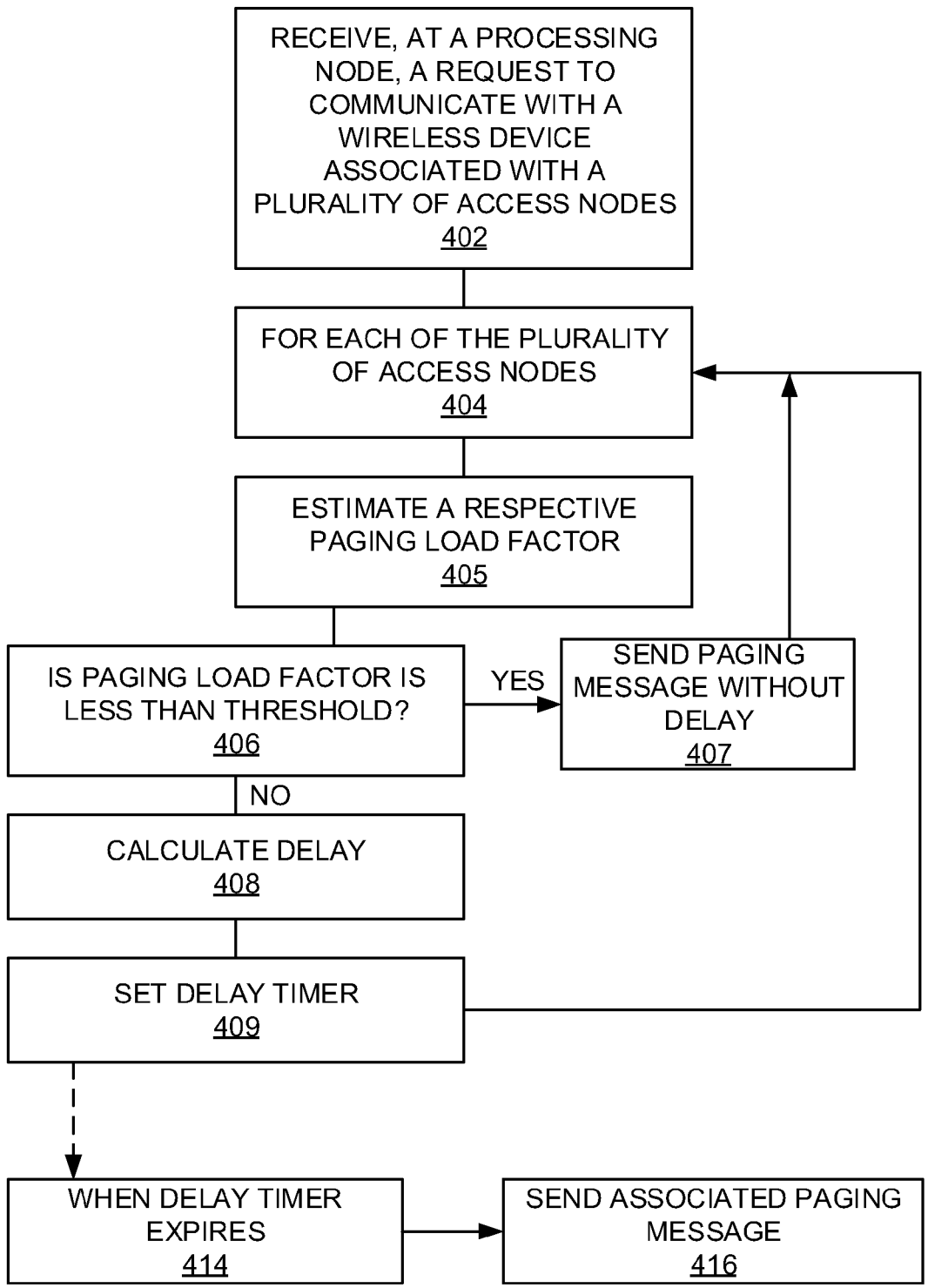
FIG. 4 is a flowchart illustrating a method of operating a wireless device paging system.

FIG. 4 is a flowchart illustrating a method of operating a wireless device paging system. The steps illustrated in FIG. 4 may be performed by one or more elements of communication system 100. At a processing node, a request to communicate with a wireless device that is associated with a plurality of access nodes is received (402). For example, mobility node 150 may receive, from network 160, a request to communicate with wireless device 120. Wireless device 120 is associated with tracking area 140 which includes access node 110 and access node 111.

For each of the plurality of access nodes, steps 405 through 409, as appropriate, are performed (404). Accordingly, for a respective access node, a respective paging load factor is estimated (405). For example, for access node 110, a paging load factor associated with access node 110 is estimated by mobility node 150. The paging load factor estimates can be based on the number of paging messages that have been sent to the respective access node 110-113 and are still active. An active paging message is one that: (1) has been sent to a respective access node 110-111, (2) mobility node 150 has not received a reply, and (3) the paging response timer associated with that message has not expired. The paging load factors may be expressed as a percentage. The paging load factor estimates may be updated periodically. The paging load factor estimates may be updated whenever a response is received to a paging message and/or whenever a paging response timer expires.

If the paging load factor is less than a threshold, flow proceeds to block 407. If the paging load factor is not less than a threshold, flow proceeds to block 408 (406). If the paging load factor is less than the threshold, a paging message is sent without delay (407). Flow then proceeds back to block 404 for processing associated with the next access node.

If the paging load factor is not less than the threshold, a delay is calculated (408). For example, mobility node 150 can calculate a delay that it will wait before sending a paging message to a respective access node 110-111. This delay can be calculated as a function of the paging load factor. This delay can be calculated as a function of the paging load factor and one or more paging response timer(s) associated with paging messages that have already been sent to a respective access node 110-111.

A delay timer is set (409). Flow then proceeds back to block 404 for processing associated with the next access node. For example, mobility node 150 can set a timer associated with a respective access node 110-111 for the respective delay time calculated in block 408.

When the delay timer expires, flow proceeds to block 416 (414). The paging message associated with the delay timer or respective access node is sent (416). For example, when the delay timer associated with a respective access node 110-111 expires, mobility node 150 sends the associated paging message to the respective access node 110-111.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access node 110, access node 111, access node 112, access node 113, mobility node 150, network 160, wireless device 120, wireless device 121, wireless device 122, and/or wireless device 123.

Figure 5:
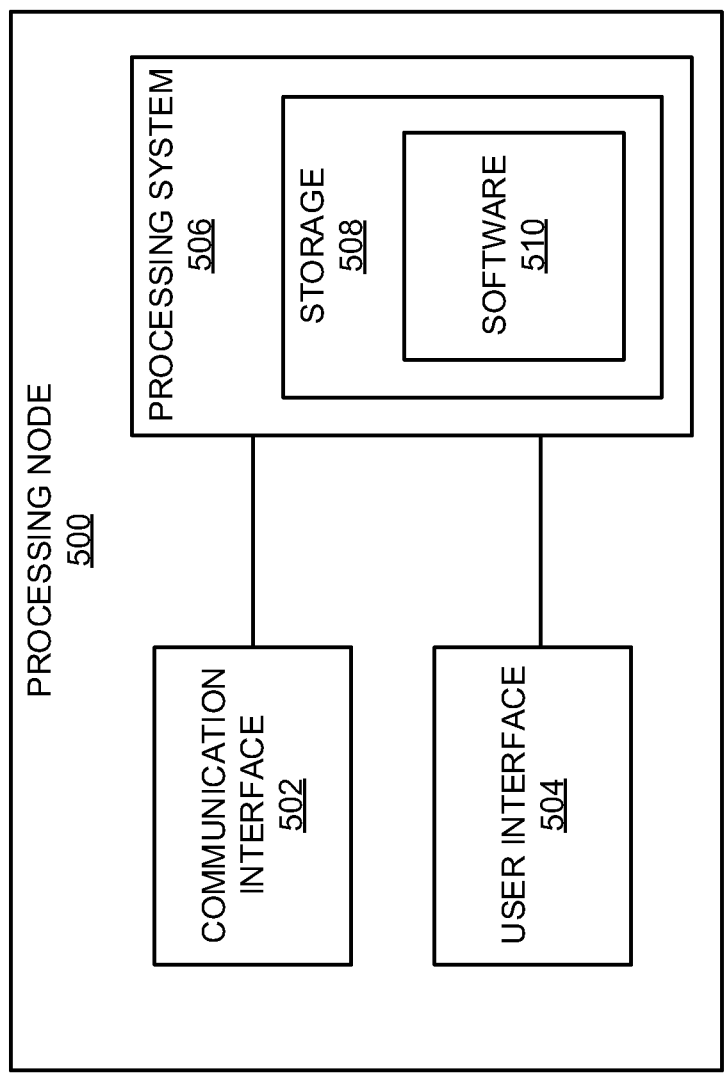
FIG. 5 illustrates a processing node.

FIG. 5 illustrates an exemplary processing node 500 comprising communication interface 502, user interface 504, and processing system 506 in communication with communication interface 502 and user interface 504. Processing node 500 is capable of paging a wireless device. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

Examples example of processing node 500 includes access node 110, access node 111, access node 112, access node 113, and/or mobility node 150. Processing node 500 can also be an adjunct or component of a network element, such as an element of access node 110, access node 111, access node 112, access node 113, mobility node 150, network 160, wireless device 120, wireless device 121, wireless device 122, wireless device 123, a mobility management entity, a gateway, a proxy node, or another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
   receiving a request associated with a wireless device;
   in response to the request, determining that at least one paging message is to be sent to an access node associated with the wireless device; and,
   based on an indicator of a paging load associated with the access node meeting a requirement threshold, determining a wait period before sending, to the access node, a first paging message that is associated with the request, wherein the wait period is based on a maximum one of a plurality of timeout indicators associated with a respective plurality of selected paging messages that have been sent to the access node.

2. The method of claim 1, wherein the wait period is based on the indicator of the paging load.

3. The method of claim 1, wherein the wait period is based on the indicator of the paging load and a timeout indictor associated with a second paging message that has been sent to the access node.

4. The method of claim 1, wherein the wait period is based on a quality of service indicator associated with the paging request.

5. The method of claim 1, wherein the wait period is based on a plurality of timeout indicators associated with a respective plurality of paging messages that have been sent to the access node.

6. The method of claim 1, wherein the plurality of selected paging messages that have been sent to the access node are selected based on a number of paging messages that cause the indicator of the paging load to exceed the requirement threshold.

7. A communication system, comprising:
a first access node configured to receive paging messages; and,
a processing node configured to send paging messages to the first access node, the processing node further configured to, based on a first indicator of a first paging load associated with the first access node meeting a first requirement threshold, determine a first wait period before sending, to the first access node, a first paging message, wherein the processing node is configured to select a plurality of paging messages that have been sent to the first access node and base the first wait period on a plurality of timeout indicators respectively associated the plurality of paging messages, and wherein the processing node selects the plurality of paging messages based on the plurality of timeout indicators and a number of paging messages that have been sent to the first access node that cause the first indicator of the first paging load to exceed the first requirement threshold.

8. The communication system of claim 7, wherein the first wait period is based on the first indicator of the first paging load associated with the first access node.

9. The communication system of claim 7, wherein the first wait period is based on the first indicator of the first paging load associated with the first access node and a first timeout indictor associated with a second paging message that has been sent to the first access node.

10. The communication system of claim 7, wherein the first wait period is based on a quality of service indicator.

11. The communication system of claim 7, further comprising:
a second access node configured to receive paging messages, the processing node configured to send paging messages to the second access node, the processing node further configured to, based on a second indicator of a second paging load associated with the second access node meeting a second requirement threshold, select a second wait period before sending, to the second access node, a second paging message.

12. The communication system of claim 11, wherein the second wait period is selected to minimize a time before sending the second paging message to the second access node.

13. A method of operating a communication system, comprising:
receiving, at a processing node, a request to communicate with a wireless device;
in response to the request, initiating a paging procedure that includes sending a first paging message to a first access node and a second paging message to a second access node; and,
based on a first indicator of a first paging load associated with the first access node, select a first wait period before the first paging message is to be sent to the first access node, wherein the first wait period is further selected based on a maximum expiration time of a plurality of unacknowledged paging messages that have been sent to the first access node;
based on a second indicator of a second paging load associated with the second access node, select a second wait period before the second paging message is to be sent to the second access node.

14. The method of claim 13, wherein the first wait period is selected based on the first indicator meeting a requirement threshold and the second wait period is selected based on the second indicator failing to meet the requirement threshold.

15. The method of claim 13, wherein a total number of the plurality of unacknowledged paging messages is selected based on a number of paging messages that cause the first indicator to exceed the requirement threshold.

16. The method of claim 13, wherein the first wait period is further selected based on a maximum paging latency associated with a quality of service indicator.

\* \* \* \* \*